United States Patent [19]
Perich et al.

[11] Patent Number: 5,766,686
[45] Date of Patent: Jun. 16, 1998

[54] SPRAY INSULATING COATING FOR REFRACTORY ARTICLES

[75] Inventors: Regis M. Perich, Boalsburg; Harold D. Prior, Jr.; Daniel F. Fura, both of State College, all of Pa.

[73] Assignee: North American Refractories Co., Cleveland, Ohio

[21] Appl. No.: 609,469

[22] Filed: Mar. 1, 1996

[51] Int. Cl.$^6$ .......................................................... B05D 3/02
[52] U.S. Cl. .................. 427/314; 427/376.2; 427/377.7; 427/422; 427/427
[58] Field of Search .................................. 427/314, 376.2, 427/377.7, 422, 427; 501/80, 94, 95.1, 133

[56] References Cited

U.S. PATENT DOCUMENTS

| | | |
|---|---|---|
| 4,037,015 | 7/1977 | Koike et al. |
| 4,090,881 | 5/1978 | Keel et al. |
| 4,194,914 | 3/1980 | Moriya et al. ............ 106/18.14 |
| 4,379,111 | 4/1983 | Smith et al. ............ 264/137 |
| 4,385,135 | 5/1983 | Langer et al. |
| 4,559,270 | 12/1985 | Sara ............ 428/408 |
| 4,612,240 | 9/1986 | Johnson et al. |
| 4,640,848 | 2/1987 | Cerdan-Diaz et al. ............ 427/426 |
| 4,673,594 | 6/1987 | Smith |
| 4,680,239 | 7/1987 | Yano et al. ............ 428/688 |
| 4,904,503 | 2/1990 | Hilton et al. |
| 5,062,897 | 11/1991 | Katsumata et al. ............ 106/696 |
| 5,155,070 | 10/1992 | Skorupa |
| 5,250,578 | 10/1993 | Cornwell |
| 5,252,526 | 10/1993 | Whittemore |
| 5,624,613 | 4/1997 | Rorabaugh et al. ............ 264/44 |

FOREIGN PATENT DOCUMENTS

WO 95/11870  9/1994  WIPO.

*Primary Examiner*—Paul Marcantoni
*Attorney, Agent, or Firm*—Benesch, Friedlander, Coplan & Aronoff LLP

[57] ABSTRACT

The present invention is directed to an insulating coating for refractory articles, adapted to be applied by spraying or gunning, which is easy to apply, cost effective, eliminates the potential health hazards associated with ceramic fiber paper, and which imparts sufficient insulating properties to the refractory article in high temperature environments. More particularly, the present invention is directed to an insulating coating and a method of preparing the insulating coating wherein the coating composition is comprised of about 25% to about 75% by weight of lightweight aggregate, up to about 25% to about 75% by weight of binder, up to 0.5% by weight of organic fiber, up to about 15% by weight of an additive to improve green strength, and up to about 5% by weight of a foaming agent.

13 Claims, 3 Drawing Sheets

SPRAY INSULATING COATING FOR REFRACTORY ARTICLES

BACKGROUND OF THE INVENTION

This invention relates to an insulating coating for refractory articles to be applied by spraying or gunning. More particularly, the present invention is directed to an insulating coating for refractory articles adapted to be applied by spraying or gunning, wherein the coating imparts sufficient thermal insulation to the refractory article in high temperature environments. In particular, the present invention is directed to a spray insulating coating for refractory articles, wherein the coating is comprised of a lightweight aggregate, an additive to improve green handling strength, organic fiber, a binder, and a foaming agent.

Refractory articles are often used in high temperature environments and must resist chemical attack, withstand molten metal and slag erosion, thermal shock, physical impact, catalytic heat, and similar adverse conditions. In addition, in some refractory articles, such as casting nozzles, it is desirable to have sufficient insulating properties. Insulating coatings for refractory articles are well known. Currently, insulating coating for refractory articles, which can be effectively used in high temperature environments, have been applied by mechanically fixing or adhering ceramic fiber paper to the refractory articles. In this process, ceramic fiber paper is cut to size and bonded onto the refractory articles with any suitable adhesive. Such a process is labor intensive and requires long periods of time to mechanically apply the ceramic fiber paper adding to the cost of manufacturing insulated refractory articles. Further, the handling, cutting, and bonding of the ceramic fiber paper to the refractory article generates ceramic fibers. These fibers have been classified by IARC, the International Agency for Research on Cancer, as a possible human carcinogen. Therefore, it is apparent that improvements are necessary in the production of insulating coatings for refractory articles to eliminate the use of ceramic fiber paper as the process of applying the ceramic fiber paper to the refractory article is costly and may pose health hazards to those involved in the process.

It is desirable to have an insulating coating for refractory articles which is easy to apply, is cost effective, eliminates any potential health hazards associated with the use of refractory ceramic fibers, and which imparts sufficient insulating properties to the refractory article in high temperature environments.

SUMMARY OF THE INVENTION

In accordance with the present invention, there is provided an insulating coating for refractory articles which is easy to apply, is cost effective, eliminates the potential health hazards associated with ceramic fiber paper, and which imparts sufficient insulating properties to the refractory article in high temperature environments.

Further, in accordance with the present invention, there is provided an insulating coating for refractory articles wherein the coating is comprised of a lightweight aggregate, an additive to improve green handling strength, organic fiber, a binder, and a foaming agent.

Still further, in accordance with the prevent invention, there is provided an insulating coating comprised of:

about 25% to 75% by weight of lightweight aggregate;
about 25% to 75% by weight of a binder;
up to about 0.5% by weight of organic fiber;
up to 15% by weight of an additive to improve green handling strength; and
up to about 5% by weight of a foaming agent.

Still further, in accordance with the present invention, there is provided a process for preparing an insulating coating, the process comprising the steps of mixing the lightweight aggregate, a binder, organic fiber, an additive to improve green handling strength, and foaming agent to form a slurry, and foaming the slurry for a predetermined time in order that the coating may be applied at low pressures and to lower the density of the coating to improve the insulating properties of the coating.

An advantage of the present invention is that the insulating coating is easy to apply and cost effective.

Another advantage of the present invention is that the insulating coating eliminates the potential health hazards associated with the use of refractory ceramic fiber paper.

Yet another advantage of the present invention is that the insulating coating imparts sufficient insulation to the refractory article in high temperature environments due to its low conductivity.

BRIEF DESCRIPTION OF THE DRAWINGS

The invention may take physical form in certain parts and arrangements of parts, a preferred embodiment and method of which will be described in this specification and illustrated in the accompanying drawings which form a part hereof, and wherein.

DETAILED DESCRIPTION OF THE PREFERRED EMBODIMENTS

Figure 1:
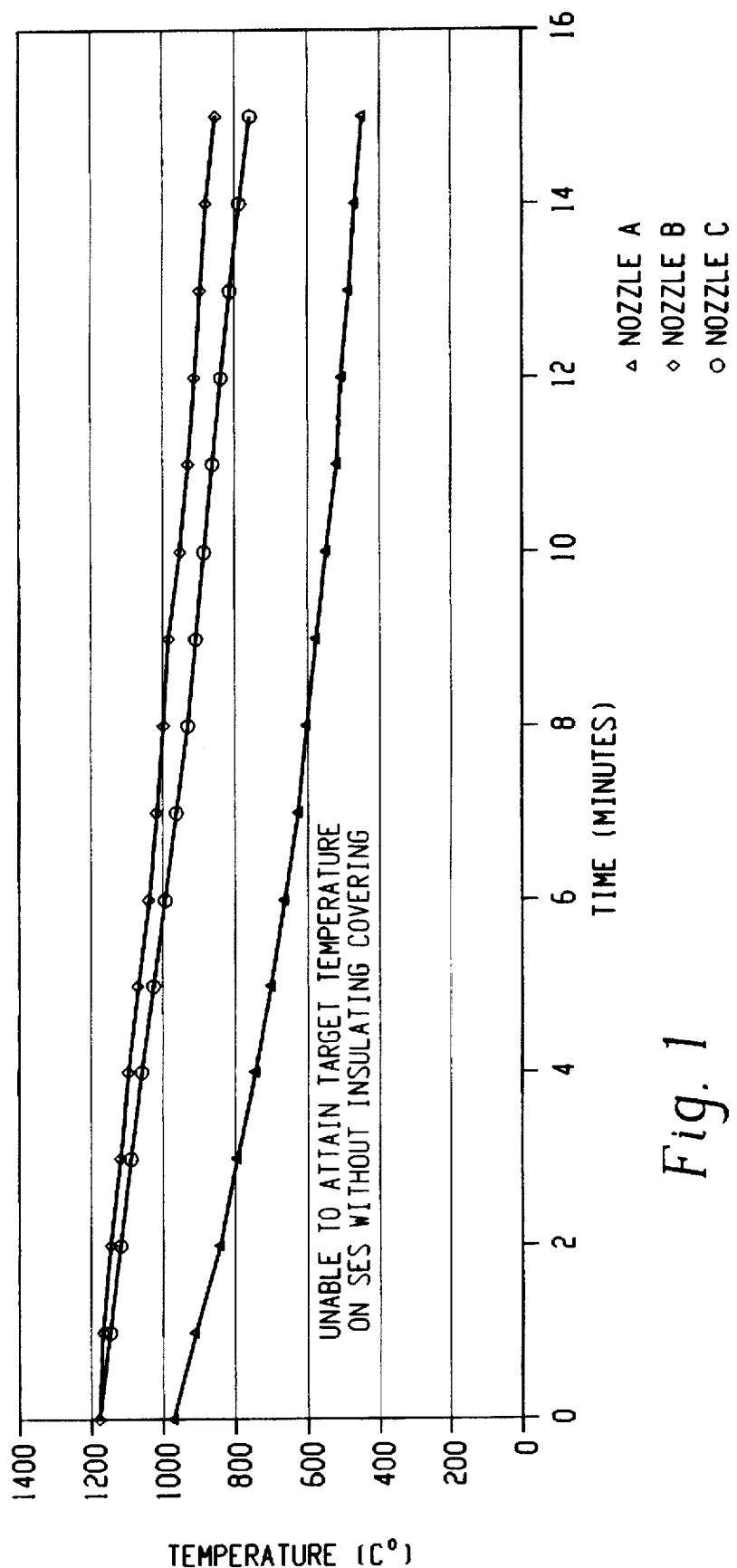
FIG. 1 is a graph illustrating heat loss of a full sized casting nozzle having an insulating coating according to the present invention, a full sized casting nozzle having an insulating coating comprised of ceramic fiber paper, and a full sized casting nozzle which does not have an insulating coating.

This invention is directed to an insulating coating for refractory articles adapted to be applied by spraying or gunning and method for preparing and applying such an insulating coating. The insulating coating for refractory articles of the present invention is easy to apply, is cost effective, eliminates the potential health hazards associated with ceramic fibers, and imparts sufficient insulating properties to the refractory article in high temperature environment. The insulating coating of the present invention is comprised of lightweight aggregate, a binder, organic fiber, an additive to improve green handling strength, and a foaming agent.

The insulating coating of the present invention is comprised or any suitable lightweight aggregate material known in the art. More particularly, suitable lightweight aggregate materials include, but are not limited to hollow ceramic microspheres, phenolic microballoons, mullite holospheres, perlite, vermiculite, bubble alumina, and mixtures thereof. Preferably, the lightweight aggregate used in the insulating coating is hollow ceramic microspheres. The hollow ceramic microspheres are suitably any alumina or alumina silicate ceramic microspheres having a particle size of about 1 micron to about 350 microns. Preferably the hollow ceramic microspheres used in the present invention should have a high refractoriness, particle strength, and size to weight ratio. A suitable commercially available product is marketed and sold under the trademark EXTENDO-SPHERES® SL and manufactured by the PQ Corporation.

The lightweight aggregate is present in the insulating coating in any suitable amount. As the amount of lightweight aggregate present in the composition increases, the final insulating properties of the composition improve, but the fluidity of the intermediate slurry decreases. Preferably, the insulating coating is comprised of about 25% to 75% by weight of lightweight aggregate. More preferably, the insulating coating is comprised of about 41.5% by weight of lightweight aggregate.

The insulating coating of the present invention is further comprised of any suitable binder known in the art. More particularly, suitable binders include, but are not limited to, colloidal silica, calcium aluminate cement, sodium silicate, other colloidal solutions, and mixtures thereof. Preferably, the binder used in the insulating coating is colloidal silica, as colloidal silica has a low thermal expansion and provides for a relatively long shelf life of the foamed coating before application. The colloidal silica binder contains about 40% by weight of silica which has an average particle size of about 12 nm. A suitable commercially available product is marketed and sold under the trademark LUDOX HS40 and manufactured by DuPont deNemours & Co.

The binder is present in the insulating coating in any suitable amount. As the amount of binder present in the composition increases, the intermediate slurry becomes more fluid, but the final insulating properties of the coating decrease. Preferably, the insulating coating is comprised of about 25% to about 75% by weight of binder. More preferably, the insulating coating is comprised of about 50.7% by weight of binder.

The insulating coating is also comprised of organic fiber. The organic fiber is any organic fiber material known in the art. The organic fibers prevent the coating from running when applied to the refractory article. Further, the organic fibers add strength to the coating and facilitate moisture removal once the coating has been applied to the refractory article. More particularly, suitable organic fiber materials include, but are not limited to, polypropylene, copolymers of vinyl chloride and vinyl acetate, NYLON, a registered trademark of DuPont deNemours & Co., polyester, and mixture thereof. Preferably, the organic fiber used in the insulating coating is polypropylene. A suitable commercially available product is marketed and sold under the trademark HERCULON T-153 organic fiber and manufactured by Hercules, Incorporated.

The organic fiber is present in the insulating coating in any suitable amount. Preferably, the insulating coating is comprised of up to 0.5% by weight of organic fiber. More preferably, the insulating coating is comprised of about 0.1% by weight of organic fiber.

The insulating coating is further comprised of any suitable strength enhancing additive known in the art. The additive improves the handling strength of the insulating coating. Suitable additives include, but are not limited to, ball clay, lignins, saccharides, aliphatics, and mixtures thereof. Preferably, the additive used in the insulating coating is plastic ball clay. The ball clay has a PCE of 31 and is essentially −45 μm. Compositionally, it is approximately 57% $SiO_2$ and 27% $Al_2O_3$. A suitable commercially available product is marketed and sold under the trademark M & D BALL CLAY and manufactured by Kentucky-Tennessee Clay Co.

The strength enhancing additive is present in the insulating coating in any suitable amount. As the amount of additive present in the coating increases, the green strength and density of the coating increases, but the insulating properties decrease. Preferably, the insulating coating is comprised of up to 15% by weight of the additive. More preferably, the insulating coating is comprised of about 5.5% by weight of the additive.

The insulating coating of the present invention is comprised of any suitable foaming agent known in the art. The foaming agent is used to foam the intermediate slurry in order that the insulating coating may be spray-applied at low pressures, and, to lower the density of the final coating to improve its insulating properties. Suitable foaming agents include, but are not limited to, ionic surfactants, anionic surfactants, and mixtures thereof. Preferably, the foaming agent is a synthetic liquid anionic biodegradable concentrate formulated for the production of low density rigid foams. A suitable commercially available product is marketed and sold under the trademark MEARLCEL 3532 and manufactured by the Mearl Corporation.

The foaming agent is present in the insulating coating in any suitable amount. The amount of foaming agent present in the composition depends on the foaming technique and equipment used to foam the intermediate slurry and the extent of foaming necessary. Preferably, the insulating coating is comprised of up to about 5% by weight of foaming agent. More preferably, the insulating coating is comprised of about 2.2% by weight of foaming agent.

In the preferred embodiment, the insulating coating of the present invention is comprised of about 25% to about 75% by weight of hollow ceramic microspheres, about 25% to 75% by weight of colloidal silica, up to 0.5% by weight of organic fiber, up to about 15% by weight of ball clay, and up to about 5% by weight of an anionic foaming agent. In a more preferred embodiment, the insulating coating of the present invention is comprised of about 41.5% by weight of hollow ceramic microspheres, about 50.7% by weight of colloidal silica, about 0.1% by weight of organic fiber, about 5.5% by weight of ball clay, and about 2.2% by weight of an anionic foaming agent.

The insulating coating of the present invention is prepared by adding the hollow ceramic microspheres, colloidal silica, organic fibers, ball clay, foaming agent, and other optional ingredients to the bowl of a mixer. The components are mixed for a period of time to form a slurry. The slurry is then foamed by high speed mixing for a period of time in order that the foamed coating may be applied at low pressures and to lower the density of the coating to improve insulating properties of the coating. Preferably, the slurry is foamed for about 1 minute to about 5 minutes.

The insulating coating of the present invention is preferably applied to preheated refractory articles by spraying or gunning using conventional equipment. Generally, it is desired to have the surface of the refractory article preheated to an elevated temperature before the coating is sprayed onto the refractory article. Preferably, the refractory article is preheated to a temperature of about 110° C. prior to the application process. Preheating the refractory article causes the coating to rapidly set and provides improved adhesion to the refractory article. If necessary, the coating can be applied in a series of relatively thin layers, each of which is rapidly set up, in order to produce a coating having any desired total thickness. The coating is applied by spraying or gunning using conventional equipment. The coating is applied to a desired thickness, generally 3–6 mm. Once the coating has been applied, the refractory article is dried for a period of time. Preferably, the refractory article is air dried for a period of about 1 hour to about 2 hours. After the refractory article is dried, the refractory article is cured. Preferably, the refractory article is cured at about 150° C. for about 6 hours to about 8 hours.

The present invention is further described in the following examples. The examples illustrate the effectiveness of the insulating coating of the present invention in insulating refractory articles. It is understood that the examples are only illustrative of preferred embodiments according to the present invention wherein the claims set forth the scope of the present invention.

EXAMPLE 1

An insulating coating according to the present invention was prepared by adding 450 ml of LUDOX HS 40 colloidal silica and 1 gram of HERCULON T-153 polypropylene fibers to the bowl of a mixer. The colloidal silica and fibers were mixed for about one minute to disperse the fibers in the colloidal silica and form a slurry. 25 ml of MEARLCEL 3532 foaming agent was added to the slurry and mixed for about 10 seconds. 64 grams of M & D ball clay was added to the slurry and the slurry mixed to disperse the clay into the slurry. 482 grams of EXTENDOSPHERES® SL hollow ceramic microspheres were slowly added and mixed into the slurry. Once all of the ingredients were mixed into the slurry, the slurry was foamed by high intensity mixing using a lightning mixer. The slurry was foamed for about 1 to 5 minutes. The foaming was completed when the slurry would not run off a spatula, held vertically, which had been dipped into the slurry and removed. At this consistency, the foamed slurry has a wet density of approximately 0.40 g/cm$^3$.

A full sized refractory casting nozzle was preheated to a temperature of about 110° C. The foamed coating was applied to the nozzle by spraying through a plaster gun at 20 psi air pressure. The coating was sprayed onto the nozzle using vertical strokes while rotating the nozzle. The nozzle was allowed to dry for about 1 minute before handling. The nozzle was then air dried at room temperature for 1 to 2 hours. The refractory nozzle was cured at about 150° C. for 6 to 8 hours. After the coating was cured it was removed from the tube and analyzed. The specific gravity of the coating was 1.09. The density of the coating was 0.59 g/cm$^3$. The porosity of the coating was about 45.8%.

The insulating coating was tested at high temperatures to test the insulating properties of the coating and the adherence of the insulating coating. A refractory nozzle which did not have an insulating coating (nozzle A), a refractory nozzle covered with ceramic fiber paper (nozzle B), and the refractory nozzle coated with the insulating coating (nozzle C) according to the present invention were fired to about 1200° C. with a flame from an oxy-propane torch directed through the bore of the nozzles. The nozzles were taken to 1200° C. and held at that temperature for 15 minutes. After 15 minutes, the internal temperature of each nozzle was measured and the flame was turned off. The temperature was measured by a thermocouple embedded 10 mm into the nozzles. The internal temperature of the nozzles was measured at the same point at regular intervals as the nozzles cooled down.

FIG. 1 is a graph illustrating the heat loss of the refractory nozzle without an insulating coating, the refractory nozzle coated with ceramic fiber paper, and the refractory nozzle coated with the insulating coating according to the present invention. In the refractory nozzle that did not have an insulating coating, the target temperature of 1200° C. could not be attained. This nozzle quickly lost heat after the torch was extinguished as the temperature dropped below 540° C. within 10 or 11 minutes. In comparison, the refractory nozzle coated with the ceramic fiber paper gradually lost heat. The temperature of this refractory nozzle did not drop below 815° C. even after 15 minutes indicating sufficient insulating properties at high temperatures. The refractory nozzle coated with the insulating coating according to the present invention had similar results to the refractory nozzle coated with the ceramic fiber paper indicating sufficient insulating properties at high temperatures.

The insulating coating was further tested at high temperatures to test the insulating coating properties of a full heating and cooling cycle. The refractory nozzle covered with ceramic fiber paper and the refractory nozzle coated with the insulating coating according to the present invention were fired to about 1200° C. with a flame from an oxy-propane torch directed through the bore of the nozzles. The temperature of nozzles was measured at the same point at regular intervals as the nozzles were heated. The temperature was measured by a thermocouple embedded 10 mm into the nozzles. Once the internal temperature of the nozzles reached 1200° C., the flame was extinguished. The internal temperature of the nozzles was measured at the same point at regular intervals as the nozzles cooled down.

Figure 2:
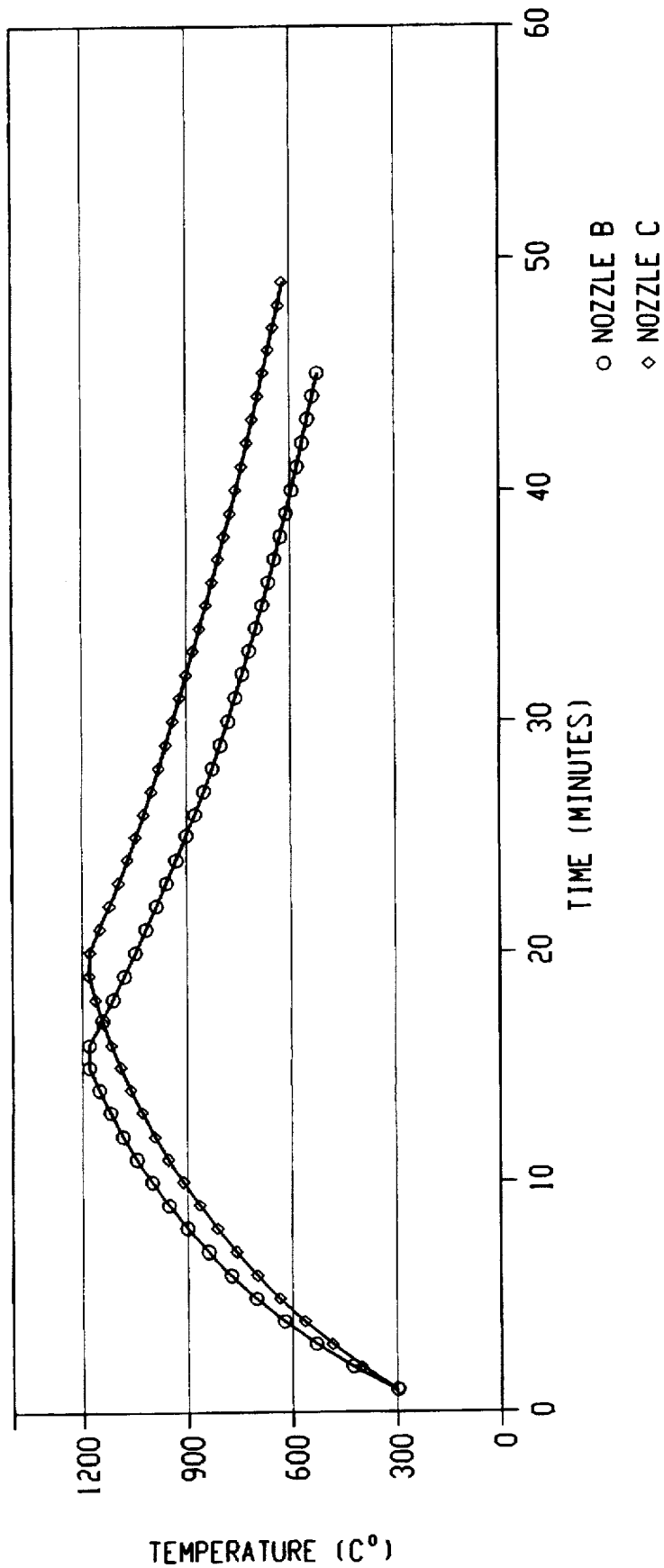
FIG. 2 is a graph illustrating a full heating and cooling cycle of a full sized casting nozzle coated with the insulating coating according to the present invention and a full size casting nozzle having an insulating coating comprised of ceramic paper.

FIG. 2 is a graph illustrating the full heating and cooling cycle of the refractory nozzle coated with ceramic paper and the refractory nozzle coated with the insulating coating according to the present invention. The refractory nozzle coated with ceramic paper quickly heated up requiring less than 20 minutes to reach the target temperature of 1200° C. and gradually lost heat as the temperature did not drop below 600° C. even after 50 minutes indicating sufficient insulating properties at high temperatures during a full heating and cooling cycle. The refractory tube coated with the insulating coating according to the present invention had similar results to the nozzle coated with ceramic paper. The refractory nozzle quickly heated to 1200° C. in less than 20 minutes and gradually lost heat once the torch was extinguished as the temperature of the nozzle only dropped below 600° C. after 40 minutes indicating sufficient insulating properties at high temperatures during a full heating and cooling cycle.

EXAMPLE 2

An insulating coating according to the present invention was prepared by adding 450 ml of LUDOX HS 40 colloidal silica and 1 gram of HERCULON T-153 polypropylene fibers to the bowl of a mixer. The colloidal silica and fibers were mixed for about one minute to disperse the fibers in the colloidal silica and form a slurry. 25 ml of MEARLCEL 3532 foaming agent was added to the slurry and mixed for about 10 seconds. 64 grams of M & D ball clay was added to the slurry and the slurry mixed to disperse the clay into the slurry. 482 grams of EXTENDOSPHERES® SL hollow ceramic microspheres were slowly added and mixed into the slurry. Once all of the ingredients were mixed into the slurry, the slurry was foamed by high intensity mixing using a Lightning mixer. The slurry was foamed for about 1 to 5 minutes. The foaming was completed when the slurry would not run off a spatula, held vertically, which had been dipped into the slurry and removed. At this consistency, the foamed slurry has a wet density of approximately 0.40 g/cm$^3$.

Figure 3:
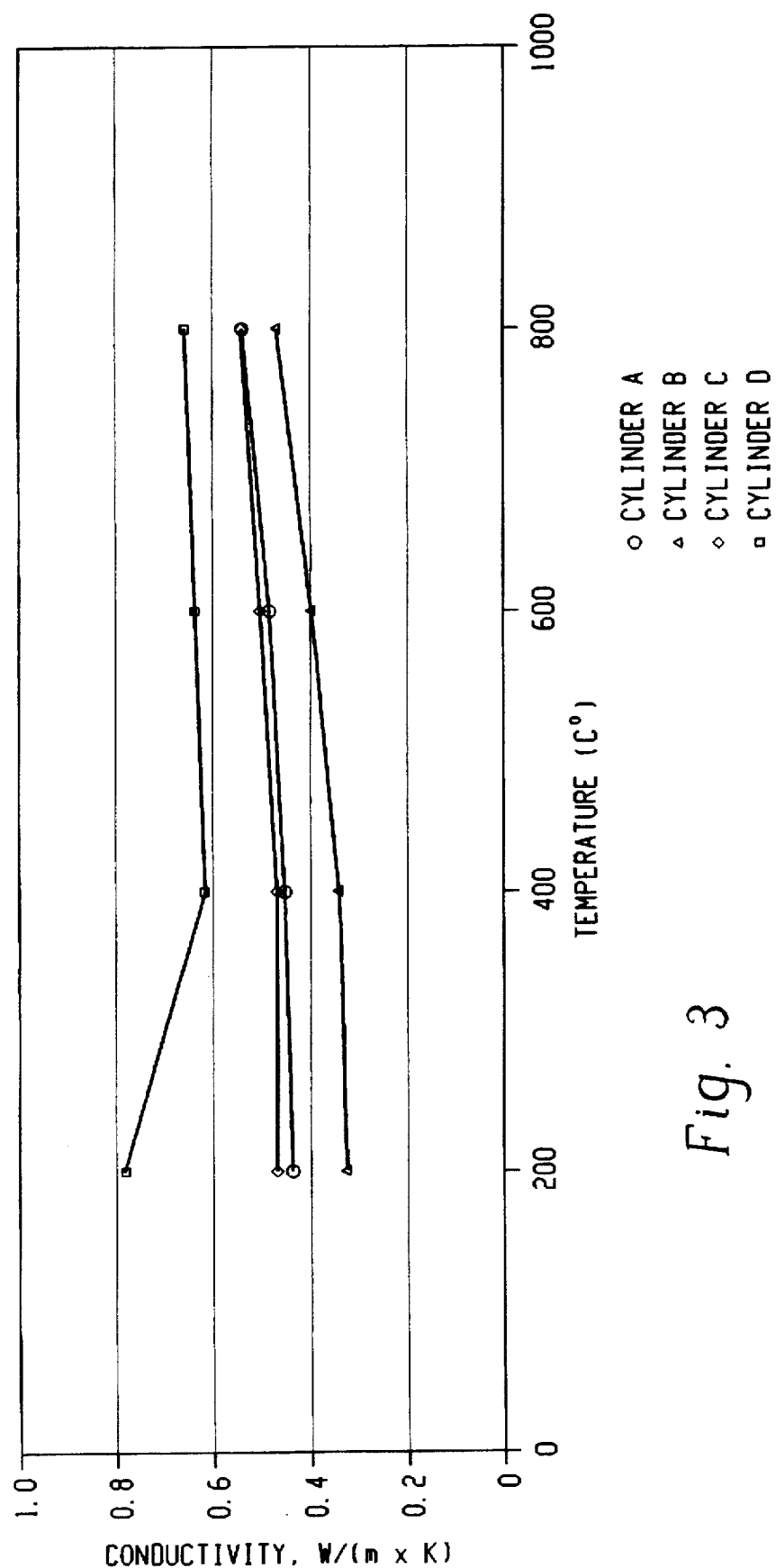
FIG. 3 is a graph comparing the thermal conductivity of a cylinder made up of the insulating coating according to the present invention, and three cylinders comprised of lightweight, insulating, refractory gun compositions.

A cylinder made from the insulating coating according to the present invention and three other cylinders comprised of lightweight, insulating, refractory gun compositions were tested for thermal conductivity. The thermal conductivity of the cylinders was determined by measuring the heat flow through the cylinder while in contact with a standard, control cylinder of known conductivity. FIG. 3 is a graph illustrating the thermal conductivity of the cylinder made from the insulating coating according to the present invention (cylinder A) and three cylinders comprised of lightweight, insulating refractory gun compositions (cylinders B, C, and D). The thermal conductivity of the cylinder made from the insulating coating according to the present invention had similar results to the three cylinders comprised of lightweight insulating refractory material indicating sufficient thermal conductivity.

The insulating coating of the present invention is easy to apply, cost effective, and eliminates the potential health hazards associated with the use of refractory ceramic fiber paper. Further, the insulating coating of the present invention imparts sufficient insulation to the refractory article in high temperature environments due to its low conductivity.

While various embodiments of an insulating coating for refractory articles and method for preparing and applying such an insulating coating have been disclosed, it should be understood that modifications and adaptations thereof will occur to persons skilled in the art. Other features and aspects of this invention will be appreciated by those skilled in the art upon reading and comprehending this disclosure. Such features, aspects, and expected variations and modifications of the reported results and examples are clearly within the scope of the invention where the invention is limited solely by the scope of the following claims.

Having thus described the invention, it is claimed:

1. A method for insulating a refractory article; said method comprising:

preheating the refractory article to about 110° C.;

applying an insulating coating to the refractory article by spraying or gunning to form an insulating coating on the refractory article, wherein said coating comprises a lightweight aggregate, a binder, organic fiber, an additive to improve green strength, and a foaming agent; and drying the refractory article.

2. The method for insulating a refractory article of claim 1 wherein said coating comprises, such as the combination yields up to 100% of the coating as comprised of:

about 25% to about 75% by weight of hollow ceramic microspheres;

about 25% to about 75% by weight colloidal silica;

up to about 0.5% by weight of organic fiber;

up to about 15% by weight of ball clay; and up to about 5% by weight of an anionic foaming agent.

3. The method for insulating a refractory article of claim 2 wherein said insulating coating comprises:

about 41.5% by weight of hollow ceramic microspheres;

about 50.7% by weight of colloidal silica;

about 0.1% by weight of organic fiber;

about 5.5% by weight of ball clay; and about 2.2% by weight of an anionic foaming agent.

4. The method for insulating a refractory article of claim 1 wherein said lightweight aggregate is selected from the group consisting of hollow ceramic microspheres, phenolic microballoons, mullite holospheres, perlite, vermiculite, bubble alumina, and mixtures thereof.

5. The method for insulating a refractory article of claim 4 wherein said lightweight aggregate is hollow ceramic microspheres.

6. The method for insulating a refractory article of claim 1 wherein said binder is selected from the group consisting of colloidal silica, calcium aluminate cement, sodium silicate, and mixtures thereof.

7. The method for insulating a refractory article of claim 6 wherein said binder is colloidal silica.

8. The method for insulating a refractory article of claim 1 wherein said additive to improve green strength is selected from the group consisting of ball clay, lignins, saccarides, aliphatics, and mixtures thereof.

9. The method for insulating a refractory article of claim 8 wherein said additive is ball clay.

10. The method for insulating a refractory article of claim 1 wherein said foaming agent is selected from the group consisting of ionic surfactants, anionic surfactants, and mixtures thereof.

11. The method for insulating a refractory article of claim 10 wherein said foaming agent is an anionic foaming agent.

12. The method for insulating a refractory article of claim 1 wherein said insulating coating resulting from the mixture, such as the combination yields up to 100% of the coating as comprised of:

about 25% to about 75% by weight of hollow ceramic microspheres;

about 25% to about 75% by weight colloidal silica;

up to about 0.5% by weight of organic fiber;

up to about 15% by weight of ball clay; and up to about 5% by weight of an anionic foaming agent.

13. The method for insulating a refractory article of claim 1 wherein the slurry is foamed for a period of about 1 minute to 5 minutes.

* * * * *